United States Patent [19]

Kato

[11] Patent Number: 5,793,005
[45] Date of Patent: Aug. 11, 1998

[54] COLLISION DETECTING APPARATUS OPERABLE IN RESPONSE TO DEFORMATION AND ACCELERATION

[75] Inventor: Ikuyasu Kato, Nishio, Japan

[73] Assignee: Nippon Soken Inc., Nishio, Japan

[21] Appl. No.: 539,375

[22] Filed: Oct. 5, 1995

[30] Foreign Application Priority Data

Oct. 6, 1994 [JP] Japan .................. 6-242909

[51] Int. Cl.⁶ .................................. H01H 35/14
[52] U.S. Cl. .................. 200/61.45 R; 200/61.44; 180/282; 280/735; 307/10.1; 307/121
[58] Field of Search ................ 180/91, 271, 274, 180/282; 200/61.41, 61.42, 61.43, 61.44, 61.45 R–61.45 M, 61.93, 82 R, 85 R, 86 R, 86 A; 280/731–735, 730 A, 737; 307/9.1, 10.1, 121; 340/436, 438; 364/424.045, 424.055

[56] References Cited

U.S. PATENT DOCUMENTS

| | | | |
|---|---|---|---|
| 3,853,199 | 12/1974 | Hirashima et al. | 180/91 |
| 4,213,635 | 7/1980 | Inokuchi et al. | 280/737 |
| 4,273,974 | 6/1981 | Miller | 200/61.43 |
| 4,785,143 | 11/1988 | Miller | 200/61.43 |
| 4,966,388 | 10/1990 | Warner et al. | 280/730 |
| 5,098,122 | 3/1992 | Breed et al. | 280/735 |
| 5,194,755 | 3/1993 | Rhee et al. | 307/10.1 |
| 5,233,141 | 8/1993 | Breed | 200/61.45 R |
| 5,285,031 | 2/1994 | Schueneman | 200/61.48 |
| 5,307,896 | 5/1994 | Taguchi et al. | 180/274 |
| 5,318,145 | 6/1994 | Vollmer | 180/274 |
| 5,390,951 | 2/1995 | Iyoda | 280/730 A |
| 5,544,716 | 8/1996 | White | 180/274 |
| 5,684,336 | 11/1997 | McCurdy | 307/10.1 |

FOREIGN PATENT DOCUMENTS

| | | | |
|---|---|---|---|
| 4-353053 | 12/1992 | Japan | B60R 21/32 |
| 5-45371 | 2/1993 | Japan | G01P 15/00 |
| 5-52681 | 3/1993 | Japan | G01L 5/00 |

Primary Examiner—Cassandra C. Spyrou
Assistant Examiner—Michael A. Friedhofer
Attorney, Agent, or Firm—Cushman Darby & Cushman IP Group of Pillsbury Madison & Sutro LLP

[57] ABSTRACT

A collision detecting apparatus (1) comprises a pair of deformation sensor (2) and G sensor (3) having output signals to be supplied to a control circuit (19). When a door outer panel (18) is deformed by collision of a vehicle, the deformation sensor (2) is turned on. Meanwhile, the door, when received an impact force, will be subjected to a large G sufficient to turn on the G sensor (3). Thus, the control circuit (19) generates an actuation signal for exploding an air bag only when the sensors (2) and (3) generate ON signals. However, when the door outer panel (18) is manually pushed or swung for opening/closing operation, only one of these two sensors (2) and (3) is turned on. Hence, the control circuit (19) does not generate the actuation signal, thereby surely detecting the collision of the vehicle and preventing the air bag from being erroneously exploded.

25 Claims, 16 Drawing Sheets

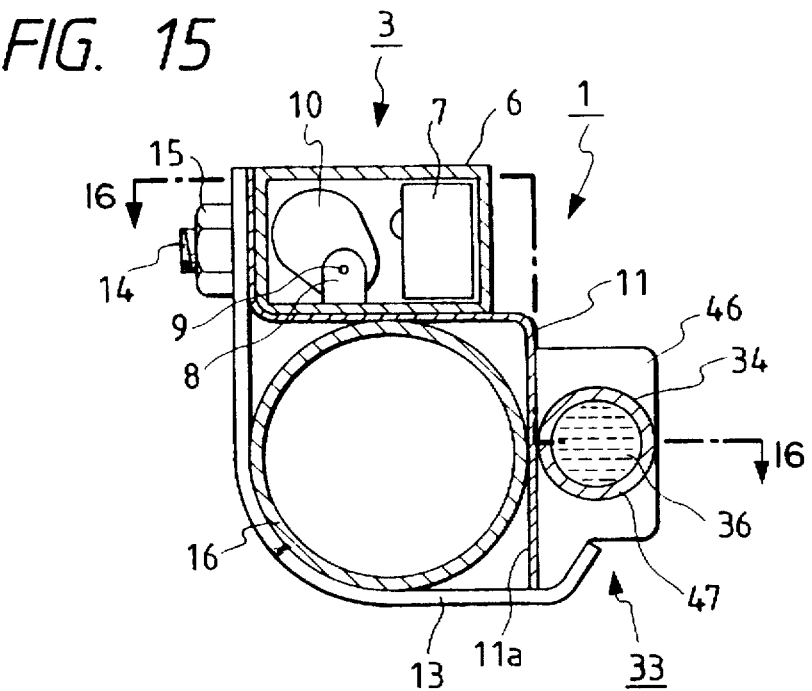
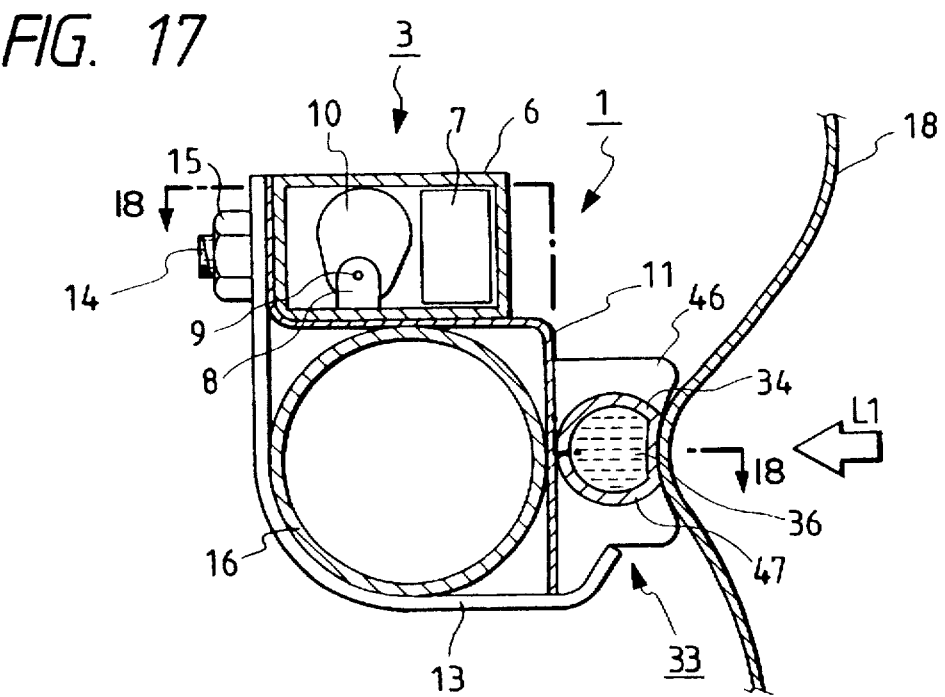

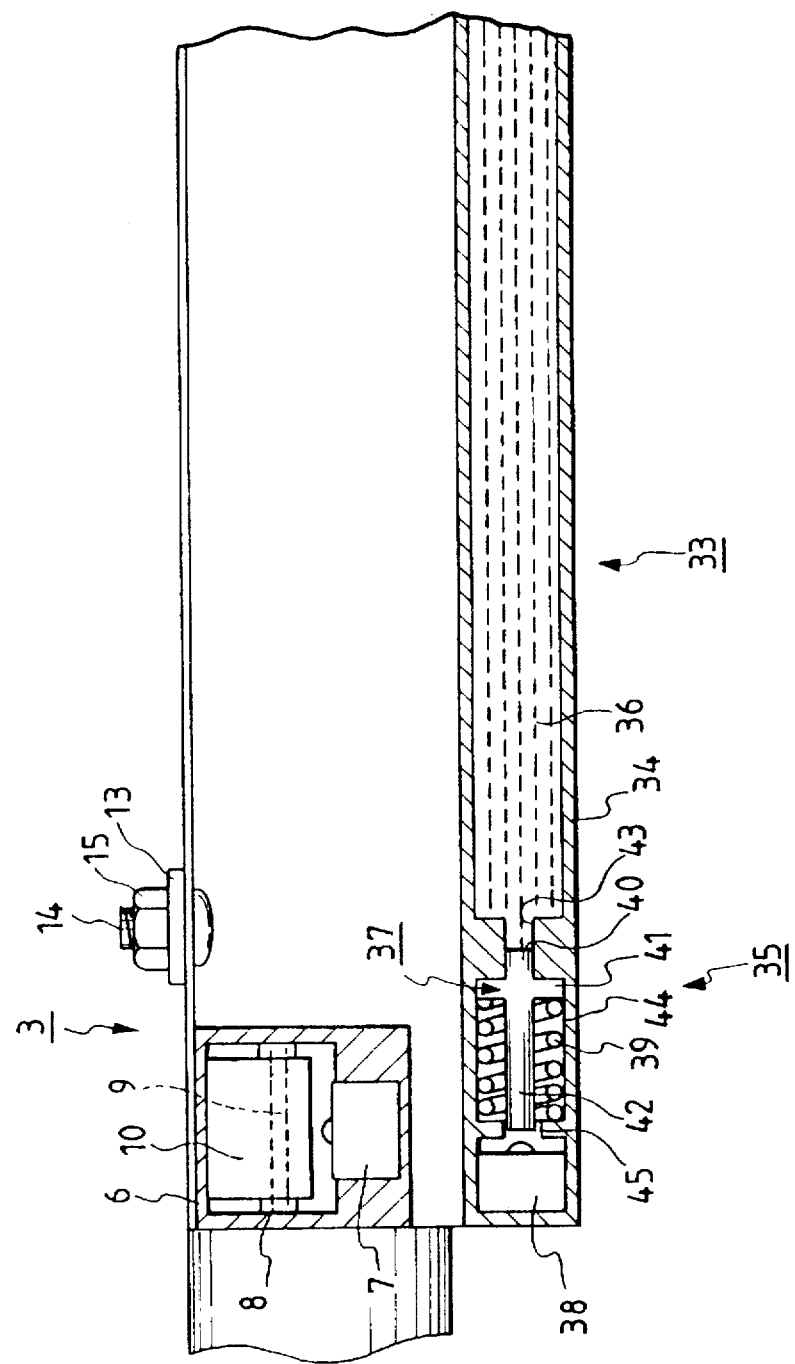

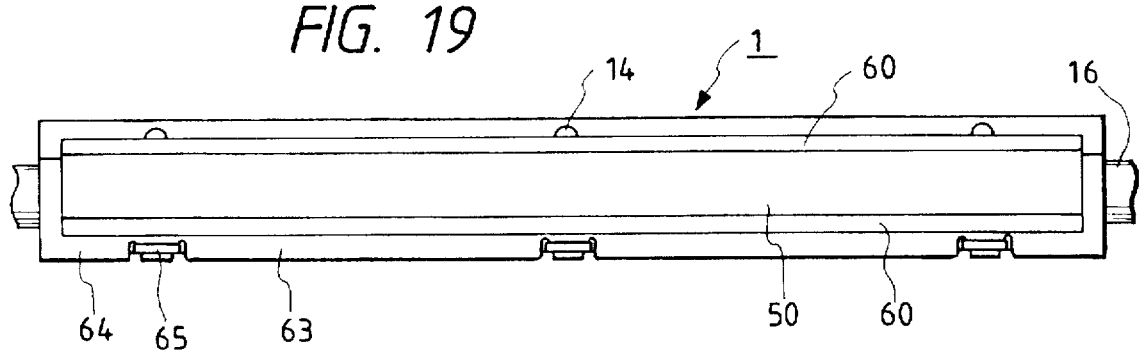
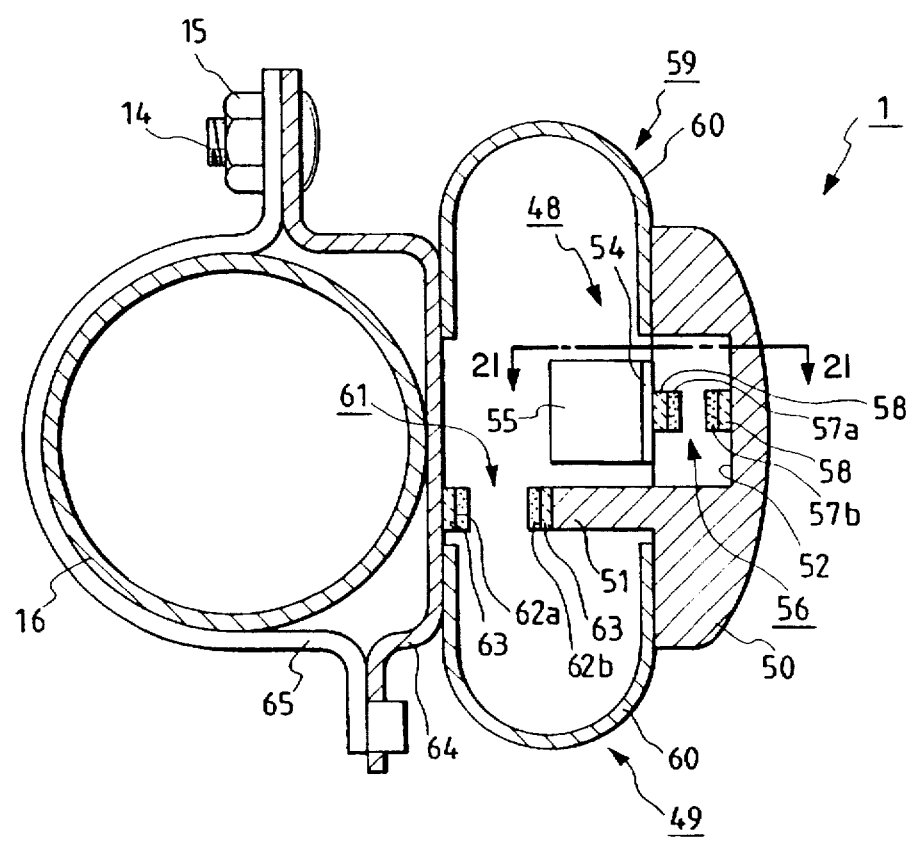

COLLISION DETECTING APPARATUS OPERABLE IN RESPONSE TO DEFORMATION AND ACCELERATION

BACKGROUND OF THE INVENTION

1. Field of the Invention

This invention relates to a collision detecting apparatus operable in response to both deformation and acceleration, and the arrangement of sensors used in such a collision detecting apparatus.

2. Prior Art

Recently, many automotive vehicles newly introduced in the market have been equipped with passenger protecting devices capable of detecting a collision and immediately deploying an air bag installed in a passenger compartment to protect the passengers.

An example of a collision detecting apparatus is disclosed, for example, in the unexamined Japanese patent application 5-052681/1993 corresponding to the U.S. Pat. No. 5,307,896, according to which an elastic member installed inside a vehicle door is moved inward when the door outer panel is deformed upon collision of the vehicle, and opposing contacts of a switch are brought into contact with each other, thereby detecting the collision of the vehicle.

However, this kind of collision detecting switch has a possibility of activating in response to an external force other than the impact force of the collision, such as a manual pushing force. For example, a person next to a vehicle may apply pressure to the outer panel be it intentionally or unintentionally. In such a case, the collision detecting switch could be activated leading to an unwanted deployment of the air bag.

SUMMARY OF THE INVENTION

Accordingly, in view of above-described problems encountered in the prior art, a principal objective of the present invention is to provide a collision detecting apparatus capable of distinguishing between a collision and otherwise incidental contact.

In order to accomplish this and other related objectives, a first aspect of the present invention provides a collision detecting apparatus comprising: means for detecting a deformation caused by a collision; means for measuring an acceleration generated by the collision; means for detecting the occurrence of a collision based on both output signals obtained from the deformation sensing means and the acceleration sensing means, respectively.

In the above first aspect collision detecting apparatus, it is preferable that the means for detecting a collision detects that occurrence only when the deformation caused by the collision and the acceleration generated by the collision are simultaneously detected by the deformation sensing means and the acceleration sensing means.

Furthermore, it is preferable that the means for detecting a collision generates an actuation signal in response to the occurrence of the collision, so that the actuation signal is supplied to an igniter for exploding an air bag installed in the vehicle.

The means for detecting deformation preferably comprises a switch that triggers in the direction of the collision and operates in response to the deformation. The means for measuring acceleration preferably comprises an inertia mass guided by a resilient member in a predetermined direction, and a switch operable in response to a movement of the inertia mass moving against a resilient force of the resilient member.

Moreover, the above collision detecting apparatus may be installed in a vehicle, and the deformation sensing means and the acceleration sensing means are both placed at a portion of the vehicle to be subjected to the collision. The collision detecting apparatus may have a configuration elongated along said portion of the vehicle. The means both for detecting deformation and for measuring acceleration may be fixed to a reinforcement beam member provided in a door of the vehicle.

Furthermore, a second aspect of the present invention provides a collision detecting apparatus provided inside an outer panel of an automotive vehicle comprising: means for detecting a deformation of the outer panel caused by a collision of the vehicle; means for detecting an acceleration generated by the collision; means for detecting the occurrence of a collision based on signals generated by both the means for detecting deformation and the means for measuring acceleration.

In the above second aspect collision detecting apparatus, it is preferable that the means for detecting a collision signals that occurrence only when the deformation of the outer panel caused by the collision and the acceleration generated by the collision are simultaneously detected by the means for detecting deformation and the means for measuring acceleration.

It is preferable that the means for detecting a collision generates an actuation signal in response to the occurrence of the collision, so that the signal triggers the deployment of an air bag installed in a passenger compartment.

The collision detecting apparatus is preferably installed adjacent to a door outer panel. In this case, the collision detecting apparatus is fixed on a reinforcement beam member in a door of the vehicle. The reinforcement beam member preferably extends in a lateral direction of the door, allowing the means for detecting deformation to extend along the inside of the door panel at the same width as a section of the reinforcement beam member.

The means for detecting deformation may be constructed using a combination of a tape switch and a lever, where the tape switch is positioned at a fixed distance from the outer panel and the lever is positioned to form a cantilever between said tape switch and said outer panel.

The lever may be divided into a plurality of leaf spring segments arrayed along the outer panel, each segment being deformable when received an external force.

Still further, the means for measuring acceleration comprises a housing, a contact switch and an eccentric mass swingable about a rotational shaft positioned on a support member; where the contact switch, the eccentric mass and the support member are accommodated in the housing so that the eccentric mass can swing and make contact with the contact switch in response to the acceleration generated by the collision.

The means for measuring acceleration may be constructed using a combination of a spring and a mass. More specifically, the means for measuring acceleration may comprise a spherical inertia mass, a compression spring, a contact switch and a lever which are accommodated together in a housing. In such an arrangement, it is desirable that the housing has first and second chambers connected by a passage, wherein the first chamber houses the inertia mass and the compression spring therein and the second chamber houses the contact switch. The lever is positioned in the passage in a matter that allows one end of the lever to be swung in response to any movement of the inertia mass against a resilient force of the compression spring in the first chamber and the other end of the lever to trigger the contact switch in the second chamber.

Yet further, the means for detecting deformation may be a liquid-in-pipe deformation sensor, constructed using a combination of a pipe filled with liquid and a piston-lever type contact switch positioned at one end of the pipe. In such a liquid-in-pipe deformation sensor, the piston-lever type contact switch may comprise a piston-lever slidable in a bore and is held at a given distance from a contact element by the force of a spring, so that the piston-lever will shift and come into contact with the contact element in response to an increased pressure of the liquid in the pipe.

It will be preferable that the pipe is elongated so as to have a length substantially equal to the entire length of the collision detecting apparatus.

The means for detecting deformation may be constructed using a pair of contacts positioned in such a manner that one contact is fixed on a rigid member and the other contact is positioned on a pressure receiving block supported by a resilient member, whereby the contacts touch each other when the pressure receiving block is resiliently moved in response to the collision of the vehicle.

Moreover, the means for sensing acceleration may be constructed using a first contact fixed on a distal end of an inertia mass supported in a cantilever manner and a second contact positioned first contact, so that the contacts touch each other when the inertia mass is swung in response to the collision of the vehicle.

In accordance with the arrangement of the present invention, it becomes possible to accurately distinguish between an actual collision and an incidental external force such as a passenger leaning on a door. Thus, it becomes possible to surely prevent the unnecessary deployment of a passenger compartment airbag.

BRIEF DESCRIPTION OF THE DRAWINGS

The above and other objects, features and advantages of the present invention will become more apparent from the following detailed description which is to be read in conjunction with the accompanying drawings, in which:

FIG. 15 is a cross-sectional view showing a structural arrangement of a collision detecting apparatus in accordance with a third embodiment of the present invention;

FIG. 16 is a cross-sectional view showing the collision detecting apparatus in accordance with the third embodiment of the present invention, taken along a line 16—16 and seen from the top of FIG. 15;

FIG. 17 is a cross-sectional view illustrating one aspect of the operational condition of the collision detecting apparatus in accordance with the third embodiment of the present invention;

FIG. 19 is a schematic view showing an overall arrangement of a collision detecting apparatus in accordance with a fourth embodiment of the present invention, seen from the side of the automotive vehicle door (i.e. from the direction of an arrow "A" in FIG. 3);

FIG. 20 is a cross-sectional view showing a structural arrangement of the collision detecting apparatus in accordance with the fourth embodiment of the present invention;

DETAILED DESCRIPTION OF THE PREFERRED EMBODIMENTS

Figure 2:
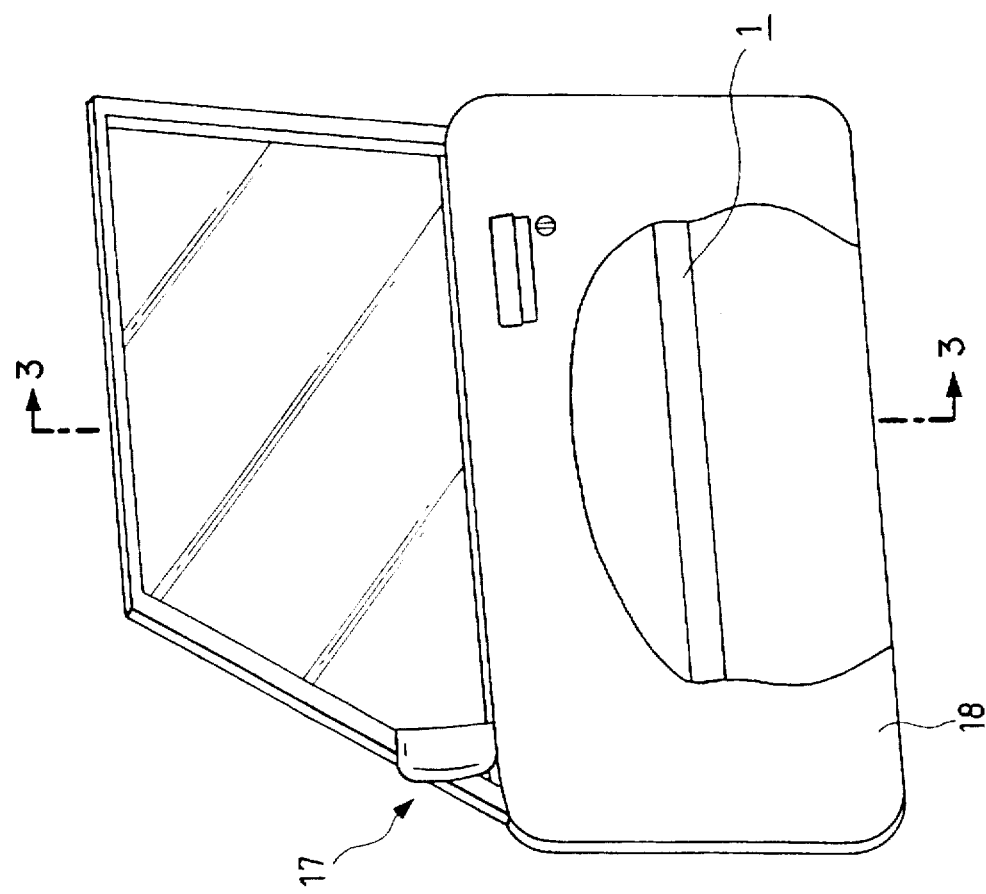
FIG. 2 is a partly broken front view showing an automotive vehicle door.

Preferred embodiments of the present invention will be explained in greater detail hereinafter, with reference to the accompanying drawings. Identical parts are denoted by identical reference numerals throughout views.

First Embodiment

Figure 3:
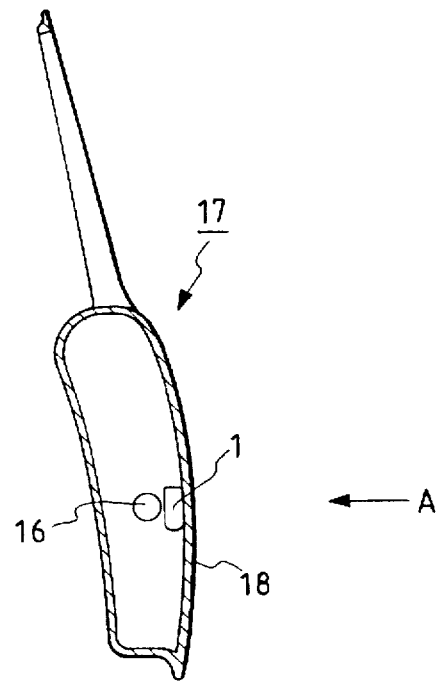
FIG. 3 is a cross-sectional view taken along a line 3—3 of FIG. 2.

FIG. 2 is a partly broken front view showing an automotive vehicle door. FIG. 3 is a cross-sectional view taken along a line 3—3 of FIG. 2. In FIG. 2, a door 17 has an inside space in which a collision detecting apparatus 1 is positioned so as to extend along the length of the door 17. As shown in FIG. 3, the collision detecting apparatus 1 is fixed to a cylindrical side door beam 16 made of a metallic pipe extending along the length of the door 17. The side door beam 16 is generally provided as a reinforcement member for increasing the rigidity of the door 17.

Figure 1:
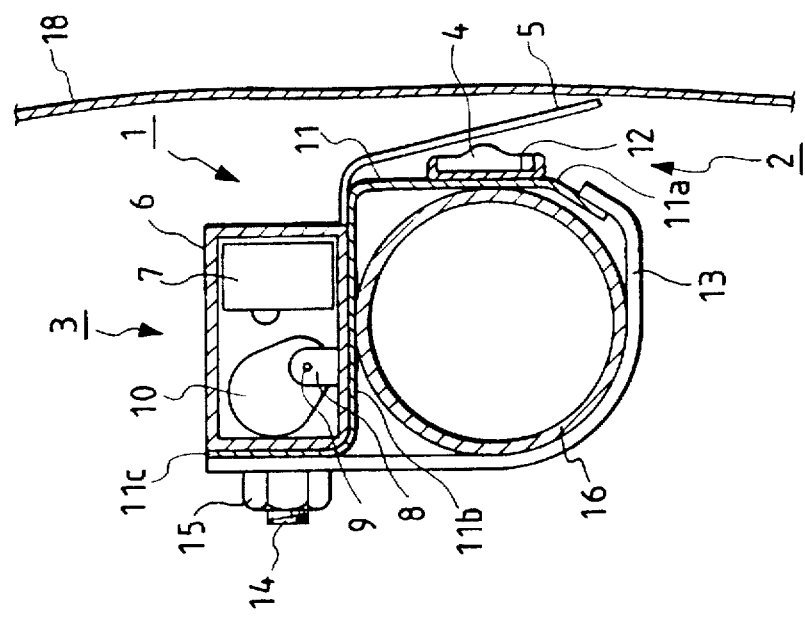
FIG. 1 is a cross-sectional view showing a structural arrangement of a collision detecting apparatus in accordance with a first embodiment of the present invention, taken along a line 1—1 of FIG. 4.
Figure 4:
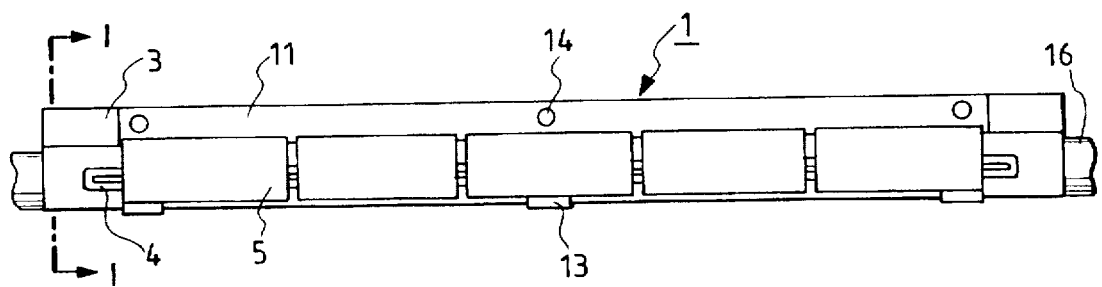
FIG. 4 is a side view showing the collision detecting apparatus installed on a side door beam in the automotive vehicle door in accordance with the first embodiment of the present invention.

FIGS. 1 and 4 show an arrangement of the collision detecting apparatus 1 installed on the side door beam 16. FIG. 1 is a cross-sectional view showing a structural arrangement of the collision detecting apparatus 1, while FIG. 4 is a side view showing the collision detecting apparatus 1 installed on the side door beam 16 and seen from the outside of the door (i.e. from a direction of an arrow "A" of FIG. 3).

The collision detecting apparatus 1 comprises a deformation sensor 2 for detecting a deformation of the door outer panel 18 and an acceleration sensor (hereinafter, abbreviated as G sensor) for detecting the magnitude of G (acceleration) acting upon collision of the vehicle.

The deformation sensor 2 is basically constituted by a combination of a tape switch 4 and a lever 5, the tape switch 4 having a copper contact covered by a thin coating film such as resin while the lever 5 being made of a leaf spring that deforms when a force is applied. The deformation sensor 2 laterally extends along the side door beam 16 and the longitudinal size of the deformation sensor 2 is substantially identical with the entire length of the side door beam 16 (Refer to FIG. 4).

More specifically, the lever 5 is made of a stainless plate bent at an intermediate point, so as to form a reversed L-shaped configuration. The lever 5 is divided into a plurality of rectangular segments arrayed in a line along the side door beam 16. The G sensor 3 basically comprises a housing 6, a contact switch 7 which contains a micro switch, and a cylindrically-shaped eccentric mass 10 with the freedom to swing about a rotational shaft 9 provided on a support member 8. The contact switch 7, the eccentric mass 10 and the support member 8 are accommodated together in the housing 6. Both the deformation sensor 2 and the G sensor 3 are fixed on a base 11 secured to the side door beam 16. The base 11 is a stainless plate formed into a crank shape, comprising a lower section 11a extending vertically, a middle section 11b extending horizontally and an upper section 11c extending vertically. The base 11 is placed on the side door beam 16 and is secured (welded) to the same at its vertical lower section 11a and horizontal middle section 11b. The lower distal end of the base 11 is bent from the lower horizontal section 11a so as to form a ridge, and the other end (i.e. upper part) 11c of the base 11 is drilled to provide a hole (not shown) into which a weld bolt 14 is inserted. A stay 13 has a middle section which is curved by the same radius as the side door beam 16. This section of the stay 13 is welded to the side door beam 16, while an upper part of the stay 13 extends straight and is connected to the upper part 11c of the base 11.

The weld bolt 14 has a head (not shown) securely welded onto the right surface of the upper part 11c of the base 11. Thus, the weld bolt 14 penetrates the hole (not shown) opened on the upper part 11c of the base 11 and protrudes horizontally beyond the stay 13.

The housing 6 of the G sensor 3 is fixed onto the horizontal middle part 11b and the vertical upper part 11c of the base 11, in such a manner that the eccentric mass 10, supported by the support member 8, leans against a wall of the housing 6 positioned at the same side as the stay 13. As shown in FIG. 4, the G sensor 3 is located to one side (the left edge in this embodiment) of the collision detecting apparatus 1.

The tape switch 4 of the deformation sensor 2 is fixed on the vertical lower section 11a of the base 11. The lever 5 of the deformation sensor 2 has a base end fixed on the horizontal middle part 11b of the lead 11 and a distal end being bent at the intermediate portion so as to extend downward obliquely. The distal end of the lever 5 is placed alongside the door outer panel 18. Thus, if the door outer panel 18 is deformed inward upon collision of vehicle, the lever 5 is depressed by the door outer panel 18 and is brought into contact with the tape switch 4.

More specifically, in order to attach the tape switch 4, a guide plate 12 of a saucer shape is welded on the vertical lower part 11a of the base 11. Subsequently, the tape switch 4 is securely coupled to said guide plate 12. Furthermore, the five rectangular segments of the lever 5 are successively welded on the edge of the horizontal middle part 11b of the base 11 at their base ends, thereby forming a row of five rectangular segments of the lever 5 arrayed in a line along the door outer plate 18. As a result, the lever 5 is interposed between the tape switch 4 and the door outer panel 18 in a spatially separated relation from each other. As shown in FIG. 4, the five rectangular segments of the lever 5 are all positioned to the right side of the G sensor 3.

Then, as shown in FIG. 1, the base 11 mounting the collision detecting apparatus 1 is connected to the stay 13 using the weld bolt 14 and a nut 15.

The stay 13 is a metallic plate and, as described above, has a curved middle section that fits around the circular configuration of the side door beam 16, and a straight upper section that connects to the vertical upper part 11c of the base 11. More specifically, the stay 13 has a lower part whose distal end is bent into a claw shape mating with the lower distal end of the base 11. Moreover, the upper part of the stay 13 has a slit groove (not shown) extending vertically for receiving the weld bolt 14.

The distal end of the lower part of the stay 13 is coupled with the distal end of the lower part of the base 11. The weld bolt 14 is inserted into the slit groove of the stay 13, and then fastened by the nut 15. As the stay 13 is welded to the side door beam 16, the collision detecting apparatus 1 is rigidly fixed to the side door beam 16 via the base 11.

Next, an operation of the collision detecting apparatus 1 of the first embodiment will be explained.

In the event of collision of the vehicle, the door outer panel 18 is deformed by an impact force, resulting in a large G. One should note that the door outer panel 18 is resilient enough to cause a deformation when pushed by hand, despite the fact that a relatively small G was generated. On the other hand, the door outer panel 18 is subjected to a large G when the door is opened or closed even though the door outer panel 18 has not been deformed.

In view of the fact described above, the present embodiment concludes that an actual collision has occurred only when the deformation of door outer panel 18 and the generation of a predetermined level G are simultaneously detected.

Figure 5:
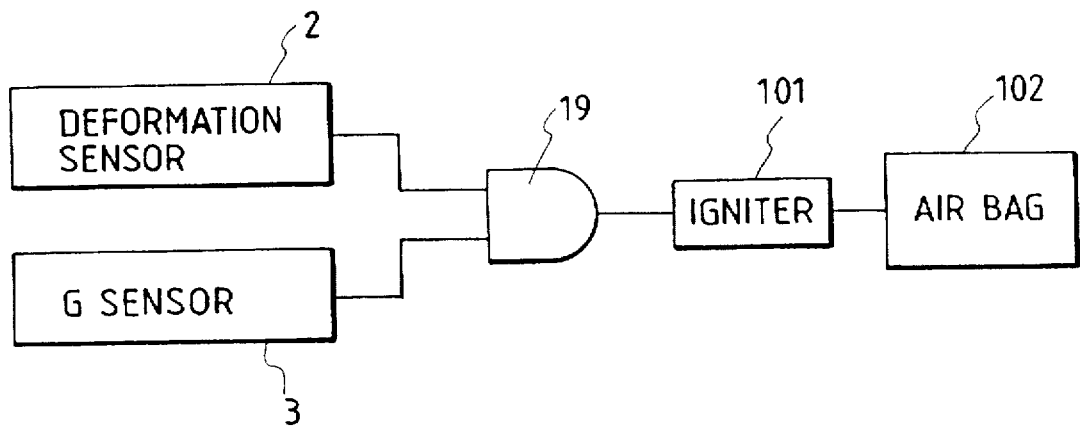
FIG. 5 is a block diagram showing a circuit arrangement of the collision detecting apparatus in accordance with the first embodiment of the present invention.

FIG. 5 shows a schematic of the circuitry for the collision detecting apparatus 1. A control circuit 19, receiving output signals from the deformation sensor 2 and the G sensor 3, generates an actuation signal only when the deformation sensor 2 detects the deformation of door outer panel 18 and the G sensor 3 detects the generation of the predetermined level G simultaneously. An igniter 101 is connected to the control circuit 19 and ignites in response to the actuation signal, thereby exploding an air bag 102 installed in a passenger compartment so as to protect a driver or other passengers from being seriously injured by the crash.

Figure 6:
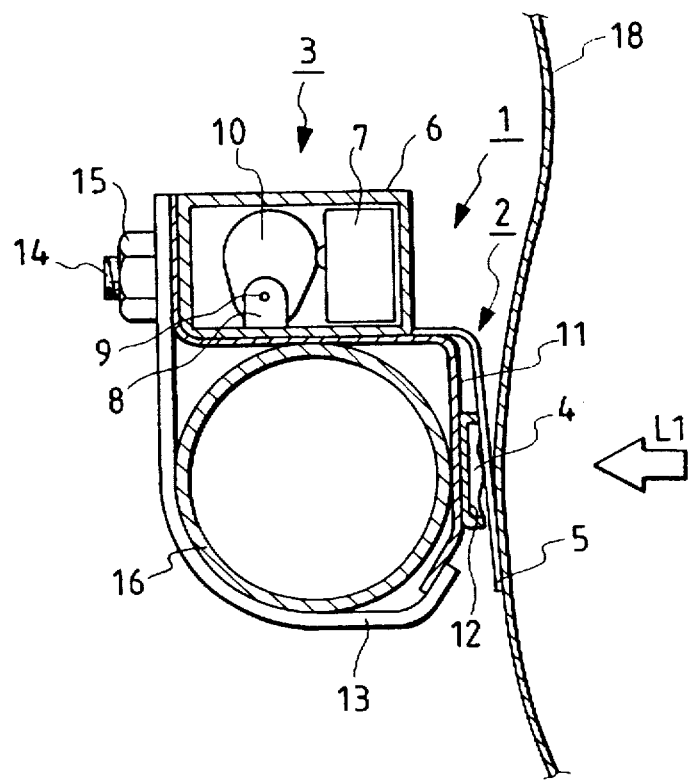
FIG. 6 is a cross-sectional view illustrating one aspect of the operational condition of the collision detecting apparatus in accordance with the first embodiment of the present invention.

FIG. 6 shows a cross-sectional view showing the response of the collision detecting apparatus 1 to an impact force L1 acting on the door outer panel 18 upon collision of the vehicle. More specifically, when received the impact force L1, the door outer panel 18 deforms inwardly so that the distal end of the lever 5 is brought into contact with the tape switch 4. Thus, the tape switch 4 is activated, causing the deformation sensor 2 to produce an ON signal and send it to the control circuit 19.

Meanwhile, the collision of the vehicle will generate a G whose magnitude is greater than a predetermined minimum, accompanied by an inertia force sufficiently large to rotate the eccentric mass 10 about the rotational shaft 9. Hence, the eccentric mass 10 is brought into contact with the contact switch 7, so as to push and turn on the contact switch 7. Thus, the G sensor 3 produces an ON signal and sends it to the control circuit 19. Accordingly, the control circuit 19 produces the actuation signal to be supplied to the igniter 101 in response to the ON signals received from both the deformation sensor 2 and the G sensor 3.

Figure 7:
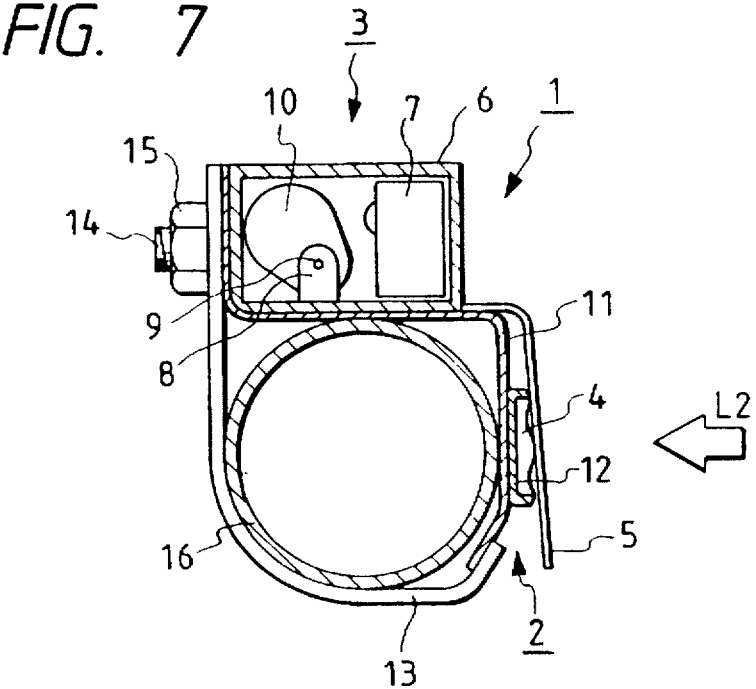
FIG. 7 is a cross-sectional view illustrating another aspect of the operational condition of the collision detecting apparatus in accordance with the first embodiment of the present invention.

FIG. 7 shows a cross-sectional view showing the response of the collision detecting apparatus 1 to the deformation of the door outer panel 18 by being pushed by a hand. More specifically when a manual pushing force L2 is applied, the door outer panel 18 (not shown in FIG. 7) deforms inwardly so that the distal end of the lever 5 is brought into contact with the tape switch 4. Thus, the tape switch 4 is turned on; therefore, the deformation sensor 2 produces an ON signal and sends it to the control circuit 19.

However, the magnitude of G generated in this case is below the minimum threshold above described, since no inertia force is acting on the door. Thus, the eccentric mass 10 does not cause a rotation about the rotational shaft 9 and remains in a default condition. Hence, the G sensor 3 continues to produce and send an OFF signal to the control circuit 19. Accordingly, the control circuit 19 does not produce the actuation signal due to presence of OFF signal sent from the G sensor 3, and thus the air bag 102 is not deployed. In this manner, the air bag 102 is prevented from being deployed unintentionally.

Figure 8:
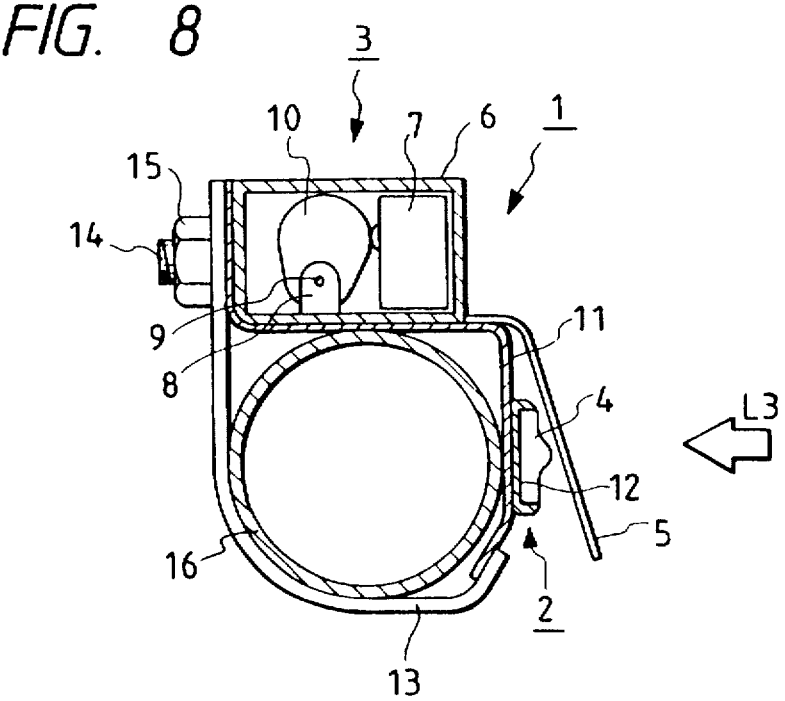
FIG. 8 is a cross-sectional view illustrating still another aspect of the operational condition of the collision detecting apparatus in accordance with the first embodiment of the present invention.

FIG. 8 shows a cross-sectional view showing the response of the collision detecting apparatus 1 to the opening/closing operation of the door. More specifically, when the door is opened or closed, a centrifugal force L3 acts on the door. When such a centrifugal force L3 causes a large amount of G that exceeds the minimum threshold above described, the eccentric mass 10 is brought into contact with the contact switch 7, so as to push and turn on the contact switch 7. Thus, the G sensor 3 produces an ON signal and sends it to the control circuit 19. However, the door outer panel 18 (not shown in FIG. 8) is not deformed in this case thus the tape switch 4 is not turned on. Namely, the deformation sensor 2 generates an OFF signal and sends it to the control circuit 19. Accordingly, the control circuit 19 does not produce the actuation signal, and thus is not exploded. Thus, the air bag 102 is prevented from being operated incorrectly.

As explained above, the present embodiment actuates the igniter 101 of the air bag 102 only when both the deformation sensor 2 and the G sensor 3 are simultaneously turned on, thereby accurately detecting a collision with the vehicle and preventing the air bag 102 from being deployed unintentionally.

Furthermore, the embodiment invention provides for the deformation sensor 2 to have a lateral length substantially equal to the entire lateral length of the collision detecting apparatus 1; thus, the collision detecting apparatus 1 can detect any collision occurring along a wide width of the vehicle door.

Second Embodiment

Figure 9:
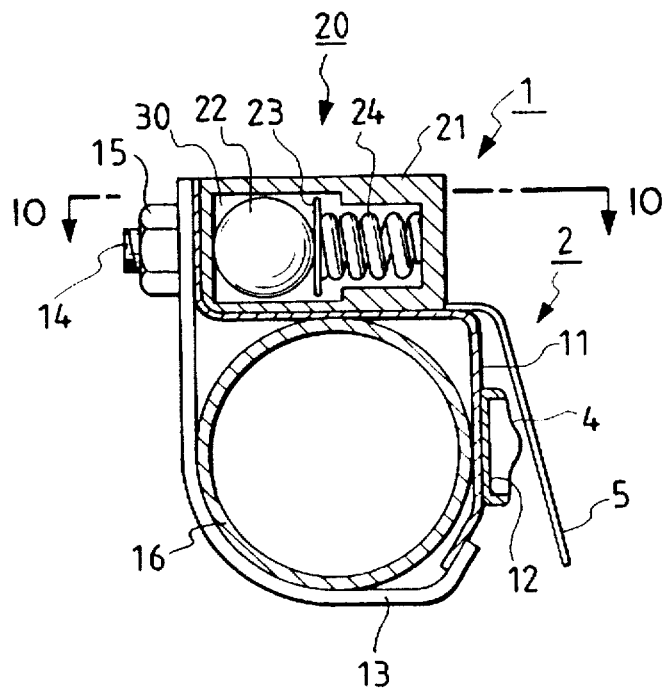
FIG. 9 is a cross-sectional view showing a structural arrangement of a collision detecting apparatus in accordance with a second embodiment of the present invention.
Figure 10:
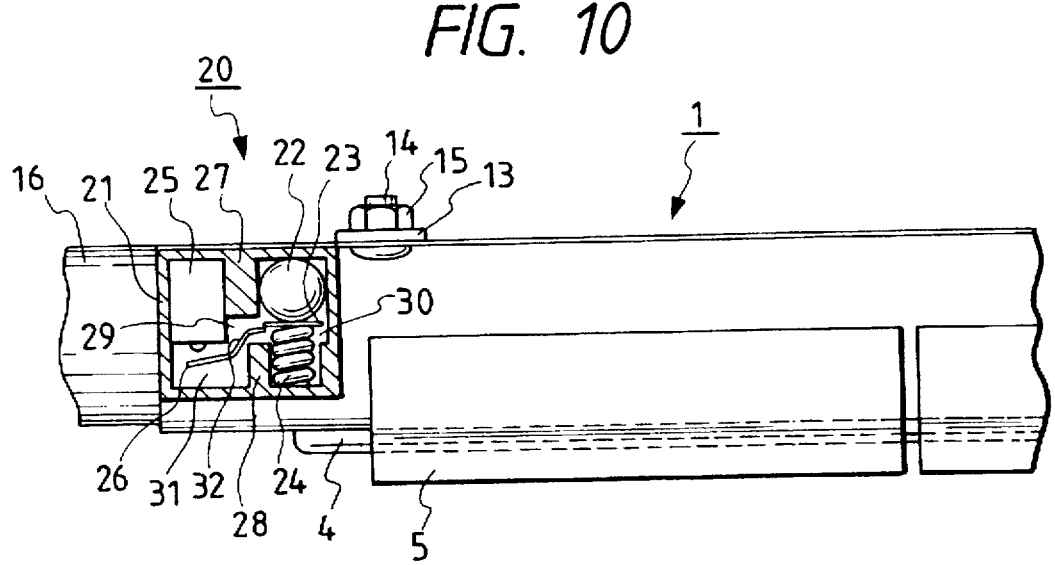
FIG. 10 is a cross-sectional view showing the collision detecting apparatus in accordance with the second embodiment of the present invention, taken along a line 10—10 and seen from the top of FIG. 9.

Next, a collision detecting apparatus equipped with a spring-mass type G sensor will be explained in accordance with a second embodiment of the present will be explained. FIG. 9 is a cross-sectional view showing a structural arrangement of the collision detecting apparatus 1 in accordance with the second embodiment of the present invention, and FIG. 10 is a cross-sectional plan view showing the collision detecting apparatus 1, taken along a line 10—10 and seen from the top of FIG. 9.

The second embodiment is different from the first embodiment in that the G sensor 3 is replaced by another type G sensor 20 which is constructed using the combination of a spring and a mass. As shown in FIG. 9, the G sensor 20 comprises a spherical inertia mass 22, a plate 23, a compression spring 24, a contact switch 25, and a lever 26; all of which are accommodated in a housing 21.

The housing 21 of the G sensor 20 is roughly separated into two chambers 30 and 31 by provision of partition walls 27 and 28. A passage 29 connects the two chambers 30 and 31. One chamber 30 has an inside space sufficient to accommodate the inertia mass 22 and the compression spring 24 therein. More specifically, as shown in FIG. 9, the compression spring 24, the plate 23 and the inertia mass 22 are placed in a row in this order in a direction normal to the plane formed by the lower straight portion of the stay 11. The compression spring 24 and the plate 23 are welded together, and the inertia mass 22 in the chamber in response to an inertia force 30 in the opposite direction of a resilient force of the compression spring 24 acting thereon. The compression spring 24 and the plate 23 are welded together, and the inertia mass 22 in the chamber 30 can slide in response to an inertia force in the opposite direction of a resilient force of compression in the spring 24. The other chamber 31 has an inside space sufficient to accommodate the contact switch 25. The partition wall 27 separates the inertia mass 22 and the contact switch 25. A rotational shaft 32 is positioned in the passage 29, and there is provided the lever 26 swingable about the rotational shaft 32.

The lever 26 is a moderately S-shaped plate. A central portion of the S-shaped lever 26 is supported by the rotational shaft 32, thus, both ends of the lever 26 can rotate about the shaft 32 like a seesaw. As shown in FIG. 10, one end of the lever 26 is engaged with the plate 23, while the other end of the lever 26 is positioned in front of the contact switch 25. The rest of the structural arrangement is the same as that of the first embodiment, and thus will not be explained.

Next, an operation of the collision detecting apparatus in accordance with the second embodiment will be explained.

Figure 11:
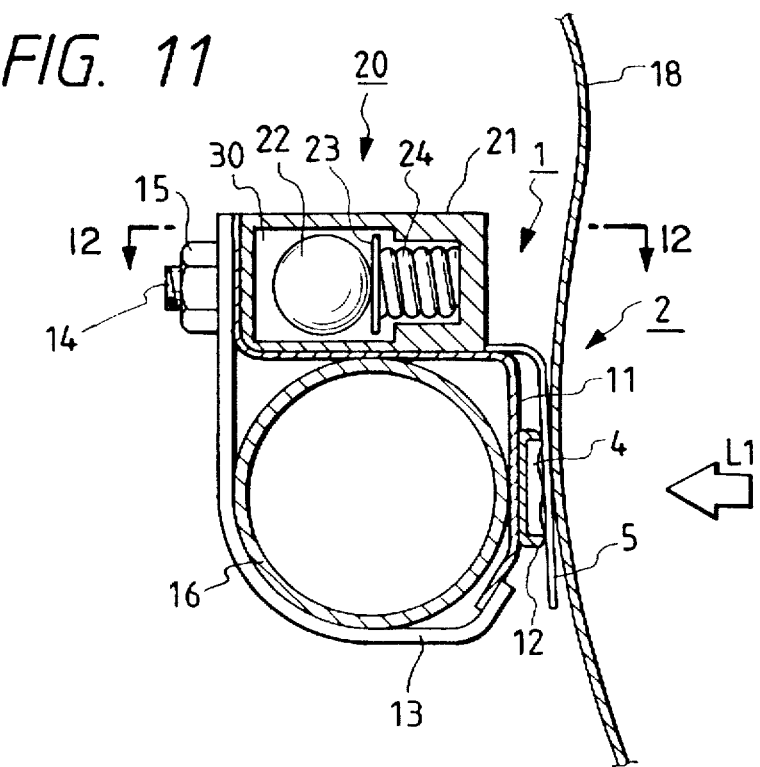
FIG. 11 is a cross-sectional view illustrating one aspect of the operational condition of the collision detecting apparatus in accordance with the second embodiment of the present invention.
Figure 12:
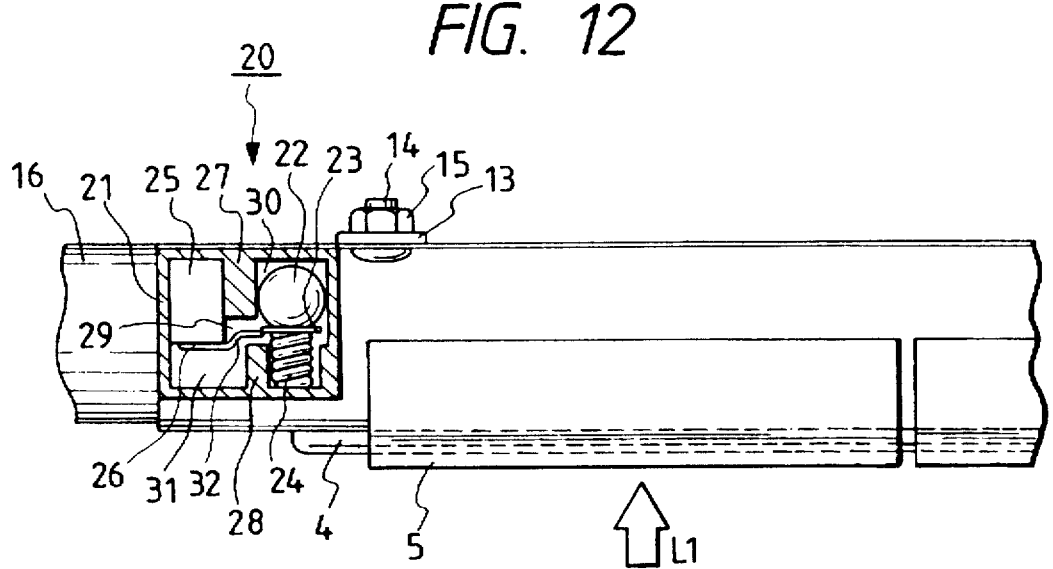
FIG. 12 is a cross-sectional view showing the collision detecting apparatus in accordance with the second embodiment of the present invention, taken along a line 12—12 and seen from the top of FIG. 11.

FIG. 11 is a cross-sectional view illustrating one aspect of the operational condition of the collision detecting apparatus 1 in accordance with the second embodiment of the present invention. And, FIG. 12 is a cross-sectional plan view showing the collision detecting apparatus 1, taken along a line 12—12 and seen from the top of FIG. 11.

When the impact force L1 is applied, the door outer panel 18 is deformed inwardly so that the lever 5 depresses the tape switch 4. Thus, the deformation sensor 2 generates an ON signal and sends it to the control circuit 19 of FIG. 5.

At the same time, the collision of vehicle will generate a acceleration greater than the predetermined minimum threshold, accompanied by an inertia force sufficiently large to shift the inertia mass 22 against the urgent force of the compression spring 24. Hence, the lever 26 is forced to rotate about the rotational shaft 32, so that the distal end of the lever 26 is brought into contact with the contact switch 25, thereby turning on the contact switch 25. Thus, the G sensor 20 produces an ON signal and sends it to the control circuit 19. Accordingly, the control circuit 19 produces the actuation signal to be supplied to the igniter 101 in response to both of ON signals received from the deformation sensor 2 and the G sensor 20.

Figure 13:
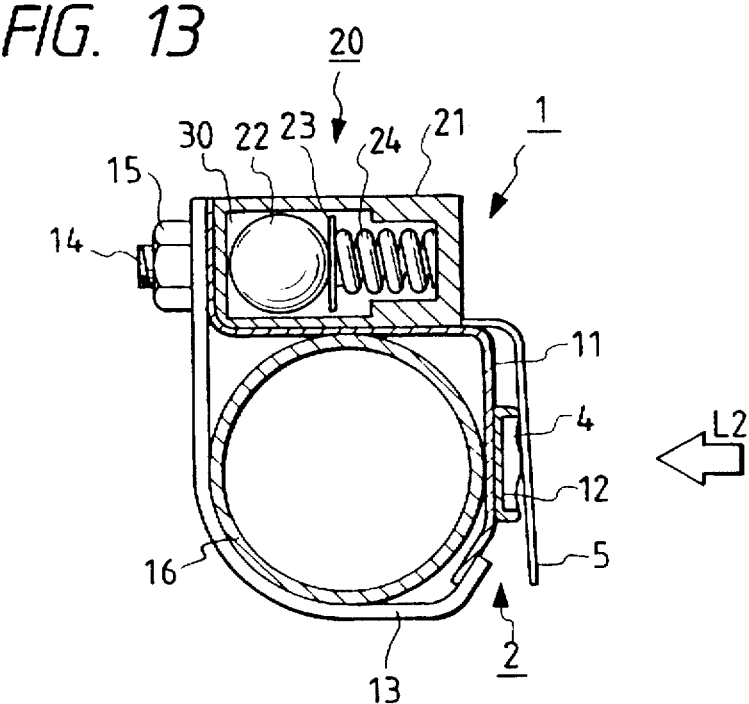
FIG. 13 is a cross-sectional view illustrating another aspect of the operational condition of the collision detecting apparatus in accordance with the second embodiment of the present invention.

FIG. 13 shows a cross-sectional view showing the response of the collision detecting apparatus 1 to deformation of the door outer panel 18 caused by being pushed by a hand. More specifically, when such a-manual pushing force L2 is applied, the door outer panel 18 (not shown in FIG. 13) deforms inwardly so that the distal end of the lever 5 supported in a cantilever manner is moved inwardly and brought into contact with the tape switch 4. Thus, the tape switch 4 is turned on; therefore, the deformation sensor 2 produces an ON signal and sends it to the control circuit 19.

However, the magnitude of G generated in this case is smaller than the predetermined threshold above described, because no inertia force acts on the door. Thus, the inertia mass 22 does not cause shift in the chamber 30, and the contact switch 25 remains in a turning-off condition. Hence, the G sensor 20 produces an OFF signal and sends it to the control circuit 19. Accordingly, the control circuit 19 does not produce the actuation signal due to presence of OFF signal sent from the G sensor 20, and thus the air bag 102 is not deployed. In this manner, the air bag 102 is prevented from being unintentionally deployed.

Figure 14:
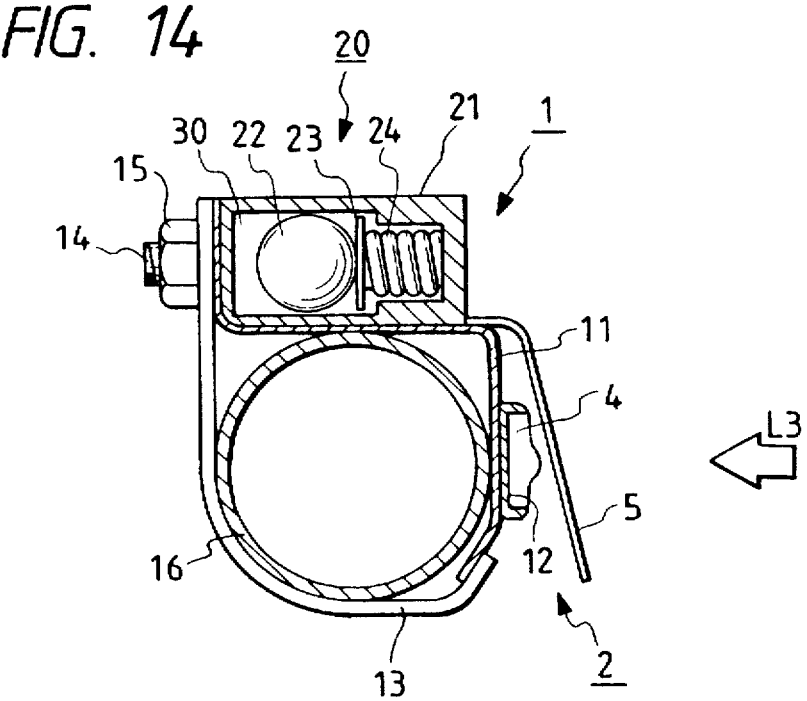
FIG. 14 is a cross-sectional view illustrating still another aspect of the operational condition of the collision detecting apparatus in accordance with the second embodiment of the present invention.

FIG. 14 shows a cross-sectional view showing the response of the collision detecting to the opening/closing operation of the door. More specifically, when the door is opened or closed, the centrifugal force L3 acts on the door. When such a centrifugal force L3 causes an acceleration higher than the predetermined threshold above described, the inertia mass 22 shifts in the chamber 30 so as to bring the lever 26 into contact with the contact switch 25, thereby pushing and turning on the contact switch 25. Thus, the G sensor 20 produces an ON signal and sends it to the control circuit 19. However, the door outer panel 18 (not shown in FIG. 14) is not deformed in this case, and the tape switch 4 is not turned on. Namely, the deformation sensor 2 generates an OFF signal and sends it to the control circuit 19. Accordingly, the control circuit 19 does not produce the actuation signal due to presence of OFF signal sent from the deformation sensor 2, and thus the air bag 102 is not exploded. In this manner, the air bag 102 is prevented from being deployed unintentionally.

As explained above, the present embodiment actuates the igniter 101 of the air bag 102 only when both the deformation sensor 2 and the G sensor 20 are simultaneously turned on, thereby surely detecting the collision of vehicle and preventing the air bag 102 from being unintentionally deployed.

Third Embodiment

Next, a collision detecting apparatus equipped with a liquid-in-pipe deformation sensor will be explained in accordance with a third embodiment of the present will be explained. FIG. 15 is a cross-sectional view showing a structural arrangement of the collision detecting apparatus 1 in accordance with the third embodiment of the present invention, and FIG. 16 is a cross-sectional plan view showing the collision detecting apparatus 1, taken along a line 16—16 and seen from the top of FIG. 15.

The third embodiment is different from the first embodiment in that the deformation sensor 2 is replaced by another type deformation sensor 33, which is constructed using the combination of a metallic pipe 34 filled with liquid 36 and a piston-lever type contact switch 35 disposed at one end of the pipe 34. The piston-lever type contact switch 35 comprises a piston-lever 37 resiliently urged by a spring 39, and a contact element 38 of a micro switch. The piston-lever 37 has a cylindrical pressure receiving portion –40 for receiving the pressure of the liquid 36 filled in the pipe 34, a cylindrical or disc-shaped head portion 41, and a cylindrical shaft portion 42 for pushing the contact section 38. The head portion 41 has a diameter larger than that of the pressure receiving portion 40.

The pipe 34, running parallel to the side door beam 16, has a length substantially equal to the total length of the collision detecting apparatus 1. One end of the pipe 34 has an inside space for housing the piston lever 37, the inside space being divided into three cylindrical bores 43, 44 and 45. The cylindrical bore 43 has a smaller diameter virtually equal to the diameter of the pressure receiving portion 40. The cylindrical bore 44 has a larger diameter virtually equal to the diameter of the head portion 41. And, the cylindrical bore 45 has a smaller diameter virtually equal to the diameter of the shaft portion 42. Thus, the piston lever 37 has the ability to slide along the cylindrical bores 43, 44 and 45.

The pressure receiving portion 40 of the piston-lever 37 is positioned to face with the inside space of the pipe 34. The shaft portion 42 is inserted into the cylindrical bore 45 so that the end or bottom face of the shaft portion 42 is located in a confronting relation to the contact element 38. The pressure receiving portion 40, the head portion 41 and the shaft portion 42 are slidably coupled into the cylindrical bores 43, 44 and 45, respectively. Although not shown in the drawing, an O-ring is fixed in a groove formed in the cylindrical bore 43, creating a hermetical seal between the piston-lever 37 and the cylindrical bore 43.

The pipe 34 is fixedly welded to the base 11 via a fixing member 46. The fixing member 46, made of stainless steel and constructed into a box shape, has a tapered section at its lower front surface and an insertion portion 47 for housing the pipe 34 therein.

The pipe 34 is inserted into and welded with the insertion portion 47 of the fixing member 46. The back face of the fixing member 46 is securely welded onto the vertical lower part 11a of the base 11. In this manner, the deformation sensor 33 is securely fixed to the side door beam 16 via the base 11.

Then, the base 11 mounting the collision detecting apparatus 1 is assembled with the stay 13 welded to the side door beam 16. The tapered section of the fixing member 46 is connected to the claw of the stay 13, thereby fixing the base 11 to the stay 13 in the same manner as the first embodiment. As the stay 13 is welded to the side door beam 16, the collision detecting apparatus 1 is securely fixed to the side door beam 16 via the base 11. The rest of the structural arrangement is the same as that of the first embodiment, and thus will not be explained.

Next, an operation of the collision detecting apparatus in accordance with the third embodiment will be explained.

Figure 18:
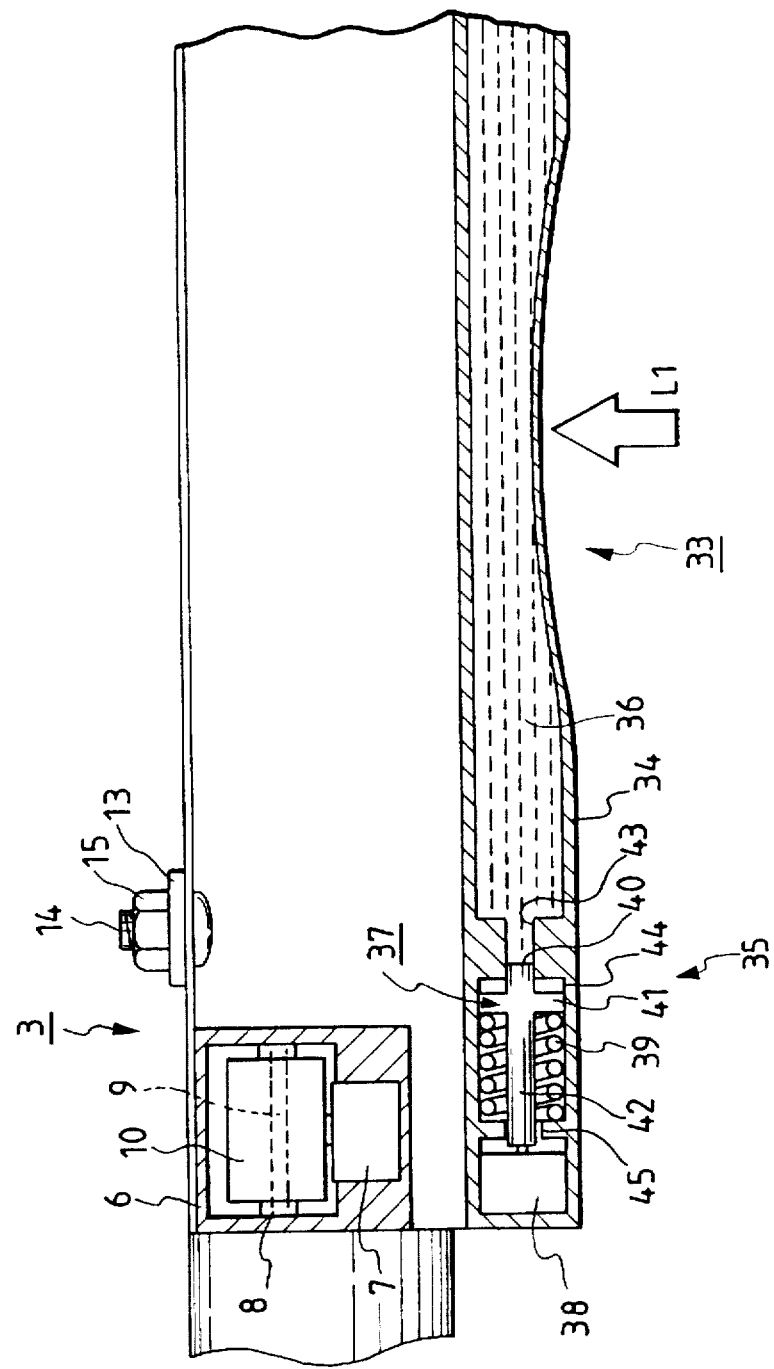
FIG. 18 is a cross-sectional view showing the collision detecting apparatus in accordance with the third embodiment of the present invention, taken along a line 18—18 and seen from the top of FIG. 17.

FIG. 17 is a cross-sectional view illustrating one aspect of the operational condition of the collision detecting apparatus 1 in accordance with the third embodiment of the present invention. FIG. 18 is a cross-sectional plan view showing the collision detecting apparatus 1, taken along a line 18—18 and seen from the top of FIG. 17.

When the impact force L1 is applied the door outer panel 18 is deformed inwardly so that the pipe 34 is deformed. In turn, this reduces the inner volume of the pipe 34, thereby increasing the pressure the liquid 36 applies to the pressure receiving portion.

The pressure receiving portion 40 of the piston-lever 37 responds by pushing outward against the urgent force of the spring 39. Thus, the shaft portion 42 of the piston-lever 37 is brought into contact with the contact member 38 so as to turn on the contact switch 35. Namely, the deformation sensor 33 generates an ON signal and sends it to the control circuit 19.

Meanwhile, the collision of vehicle will generate an acceleration whose value is greater than the predetermined minimum threshold, accompanied by an inertia force sufficiently large to rotate the eccentric mass 10 about the rotational shaft 9. Hence, the contact switch 7 is turned on, so that the G sensor 3 produces an ON signal and sends it to the control circuit 19. Accordingly, the control circuit 19 produces the actuation signal to be supplied to the igniter 101 in response to both of the ON signals received from the deformation sensor 33 and the G sensor 3.

In the same manner as the first embodiment, the collision detecting apparatus 1 has a different response to deformation of the door outer panel 18 caused by being pushed by a hand. More specifically, when received such a manual pushing force, the door outer panel 18 deforms inwardly and the contact switch 35 is turned on. Therefore, the deformation sensor 33 produces an ON signal and sends it to the control circuit 19.

However, the acceleration generated in this case is less than the predetermined threshold above described, because no inertia force acts on the door. Thus, the eccentric mass 10 is forced to swing, and the contact switch 7 remains in a default position. Hence, the G sensor 3 continues to produce and send an OFF signal to the control circuit 19. Accordingly, the control circuit 19 does not produce the actuation signal due to presence of the OFF signal sent from the G sensor 3, and thus the air bag 102 is not deployed. In this manner, the air bag 102 is prevented from being unintentionally activated.

Furthermore, the collision detecting apparatus 1 of the third embodiment responds in yet another way to the opening/closing operation of the door. More specifically, when the door is opened or closed, the centrifugal force acts on the door. When such a centrifugal force creates an acceleration that is larger than the predetermined threshold above described, the eccentric mass 10 is rotated to turn on the contact switch 7. Thus, the G sensor 3 produces an ON signal and sends it to the control circuit 19.

However, the door outer panel 18 is not deformed in this case, leaving the contact switch 35 inactivated. Namely, the deformation sensor 33 generates an OFF signal and sends it to the control circuit 19. Accordingly, the control circuit 19 does not produce the actuation signal due to presence of the OFF signal sent from the deformation sensor 33, and thus the air bag 102 is not deployed. In this manner, the air bag 102 is prevented from being unintentionally deployed.

As explained above, the present embodiment activates the igniter 101 of the air bag 102 only when both the deformation sensor 33 and the G sensor 3 are simultaneously turned on, thereby accurately detecting the collision of vehicle and preventing the air bag 102 from being unintentionally deployed.

Fourth Embodiment

Next, a collision detecting apparatus equipped with a spring-mass type G sensor and a pressure block type deformation sensor in accordance with a fourth embodiment of the present invention.

Figure 21:
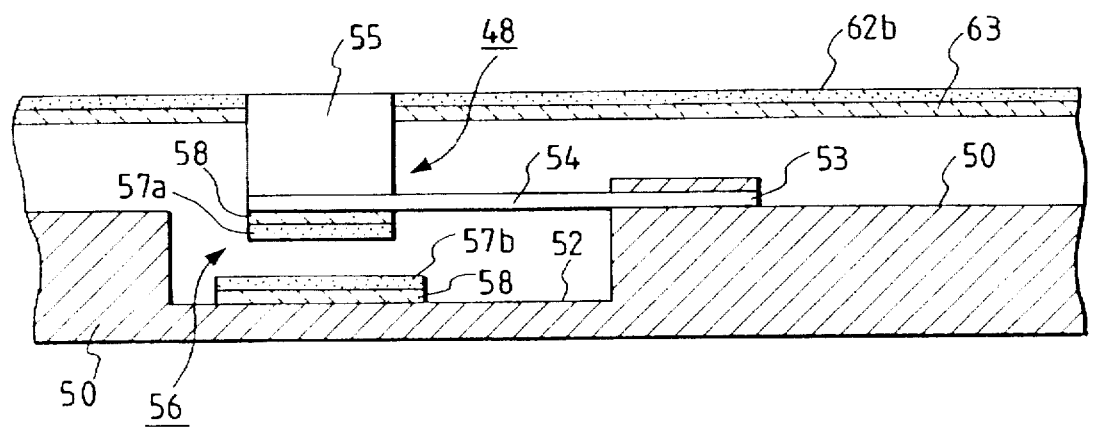
FIG. 21 is a cross-sectional view showing the collision detecting apparatus in accordance with the fourth embodiment of the present invention, taken along a line 21—21 and seen from the top of FIG. 20.
Figure 22:
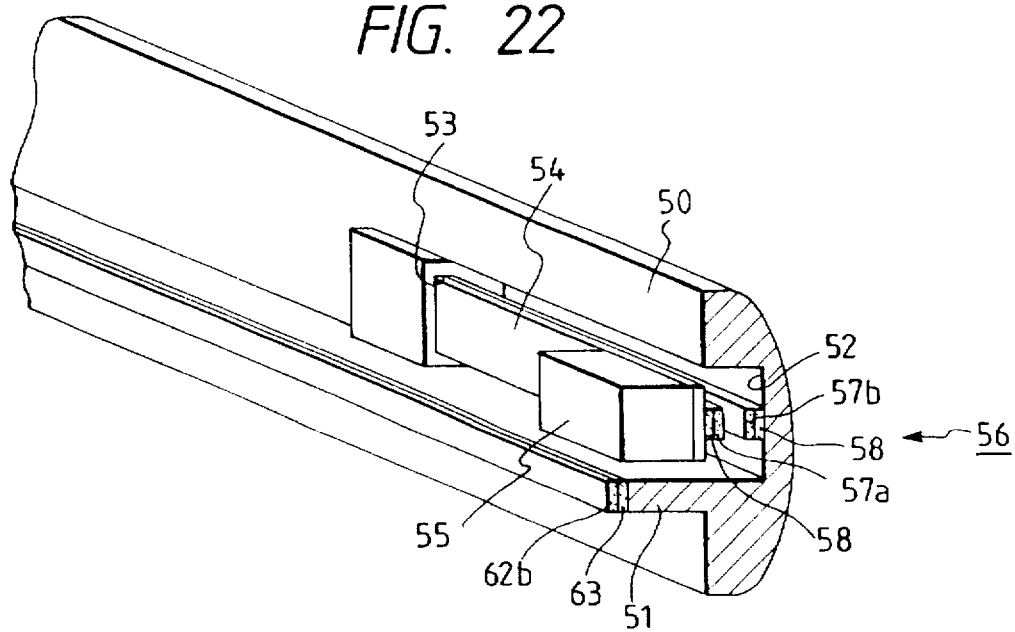
FIG. 22 is a perspective view showing a pressure block.
Figure 23A:
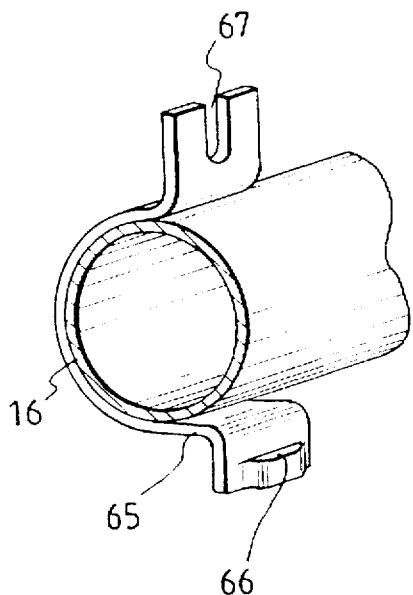
FIGS. 23a, 23b, and 23c are perspective views illustrating the way of assembling parts of the collision detecting apparatus in accordance with the fourth embodiment of the present invention.
Figure 23B:
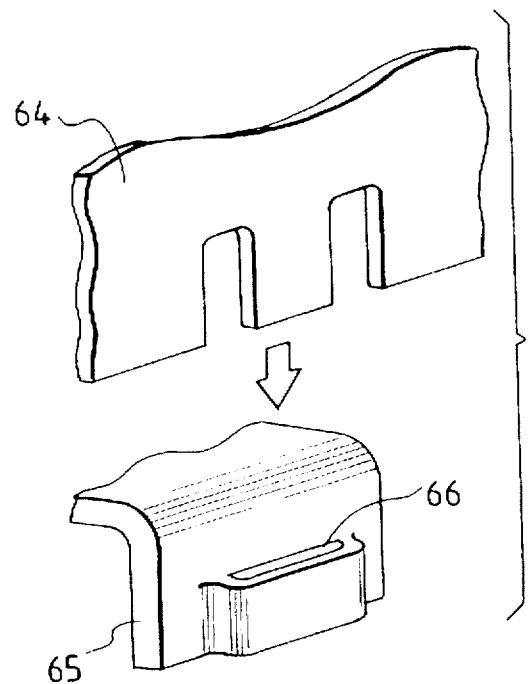
Figure 23C:
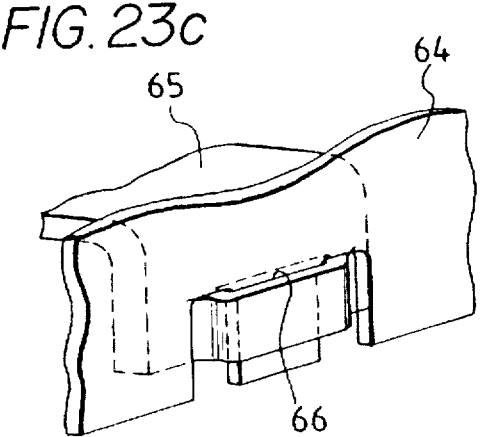

FIG. 19 is a schematic view showing an overall arrangement of the collision detecting apparatus 1 in accordance with the fourth embodiment of the present invention as seen from the side of the automotive vehicle door (i.e. from the direction of the arrow "A" in FIG. 3). FIG. 20 is a cross-sectional view showing a structural arrangement of the collision detecting apparatus 1 of the fourth embodiment. FIG. 21 is a cross-sectional plan view showing the collision detecting apparatus 1 of the fourth embodiment, taken along a line 21—21 and seen from the top of FIG. 20. FIG. 22 is a perspective view showing a pressure block 50, seen from inside thereof. Finally, FIGS. 23a, 23b, and 23c are perspective views illustrating the way of assembling a stay.

The fourth embodiment differs from the first embodiment in that the deformation sensor 2 and the G sensor 3 are replaced by a different type of deformation sensor 49 and a different type of G sensor 48, respectively.

As shown in FIGS. 20, 21 and 22, the pressure receiving block 50, having a rounded outer face and a flat inner face that together forms a "D" cross-section, is made of stainless steel and is elongated in its longitudinal direction. A protrusion 51 extends from the flat inner face of the pressure receiving block 50. A recessed space 52 is formed at one end of the pressure receiving block 50 next to the protrusion 51 as shown in FIG. 22. An insertion section 53, into which a leaf spring 54 of the G sensor 48 is inserted, is positioned in the recessed space 52 so as to protrude slightly from the that inner face of the pressure receiving block 50.

The spring-mass type G sensor 48 is positioned in the recessed space 52 at the left side of the pressure receiving block 50 in FIG. 19. The G sensor 48 comprises the leaf spring 54 having a distal end welded to an inertia mass 55, and a contact switch 56 consisting of a pair of opposing contacts 57a and 57b. The leaf spring 54, made of stainless steel, has an inner face on which the inertia mass 55 is fixed and an outer face on which the contact 57a is disposed. The other contact 57b is positioned on the opposing wall of recessed space 52. The contacts 57a and 57b are insulated from their bases (i.e. leaf spring 54 and the wall of the recessed space 52) by an insulating member 58 beneath them.

The contact 57a on the leaf spring 54 is placed at a set distance from the other contact 57b in a confronting relationship. The base end of the leaf spring 34 is inserted into the insertion section 53 of the pressure receiving block 50, and securely welded to the same. As a result, the leaf spring 54 is supported by the pressure receiving block 50 in a cantilever manner.

The deformation sensor 49 is constituted by the pressure receiving block 50 that would receive an impact force, a leaf spring 59 that would be deformed by the impact force, and a contact switch 61 operable in response to the deformation of the leaf spring 59.

More specifically, the leaf spring 59 is constituted by a pair of leaf spring segments 60 and 60. Each leaf spring segment 60 is made of an elongated stainless steel plate having the same U-shaped cross section. These leaf spring segments 60 and 60 are securely welded onto the flat inner face of the pressure receiving block 50 in such a manner that the openings of the leaf spring segments 60 and 60 face each other while keeping a set gap between them. The protrusion 51 of the pressure receiving block 50 is positioned in the gap between these leaf spring segments 60 and 60. The other side faces of these leaf spring segments 60 and 60 are welded onto a base 64 serving as a fixing member. In short, the cross section of the leaf spring 59 is formed in the shape of a race track as shown in FIG. 20.

The contact switch 61 is comprised of a pair of opposing contacts 62a and 62b. One contact 62b is positioned on the front end of the protrusion 51 of the pressure receiving block 50. The other contact 62a is positioned on the base 64. Thus, when the pressure receiving block 50 and the leaf spring 59 are welded on the base 64, the contacts 62a and 62b are positioned across from each other. These contacts 62a and 62b are insulated from the base 64 and the pressure receiving block 50 by insulating members 63 beneath them. As explained above, the collision detecting apparatus 1, comprising the pressure receiving block 50 accommodating the G sensor 48 therein and the leaf spring 59, is securely fixed on the base 64.

As shown in FIGS. 19, 20, 23a, 23b, and 23c, the base 64 is made from a stainless steel plate formed into a convex configuration. The lower end of the base 64 is engaged with the lower end of a stay 65. The upper end of the base 64 is fastened together with the upper end of the stay 65 using a mating nut 15 and a weld bolt 14 having its head welded onto the base 64. At the lower joint, the lower end of the base 64 has a comb portion to be engaged with the stay 65.

The stay 65 has a curved middle section that is shaped to fit to the circular configuration of the side door beam 16. The upper end of the stay 65 has a vertically extending slit groove 67 for receiving the weld bolt 14. The other end of the stay 65 has an insertion hole 66 into which the comb portion of the base 64 is inserted.

In installation, the side door beam 16 is welded to the stay 65. The comb portion of the base 64 is inserted into the insertion hole 66. The weld bolt 14 welded to the base 64 is inserted into the slit groove 67 of the stay 65, and the base 64 and the stay 65 are fastened at their upper ends by means of the weld bolt 14 and the nut 15. As the stay 65 is securely welded to the side door beam 16, the collision detecting apparatus 1 is securely fixed to the side door beam 16 via the base 64.

Next, an operation of the above described fourth embodiment collision detecting apparatus 1 will be explained.

Figure 24:
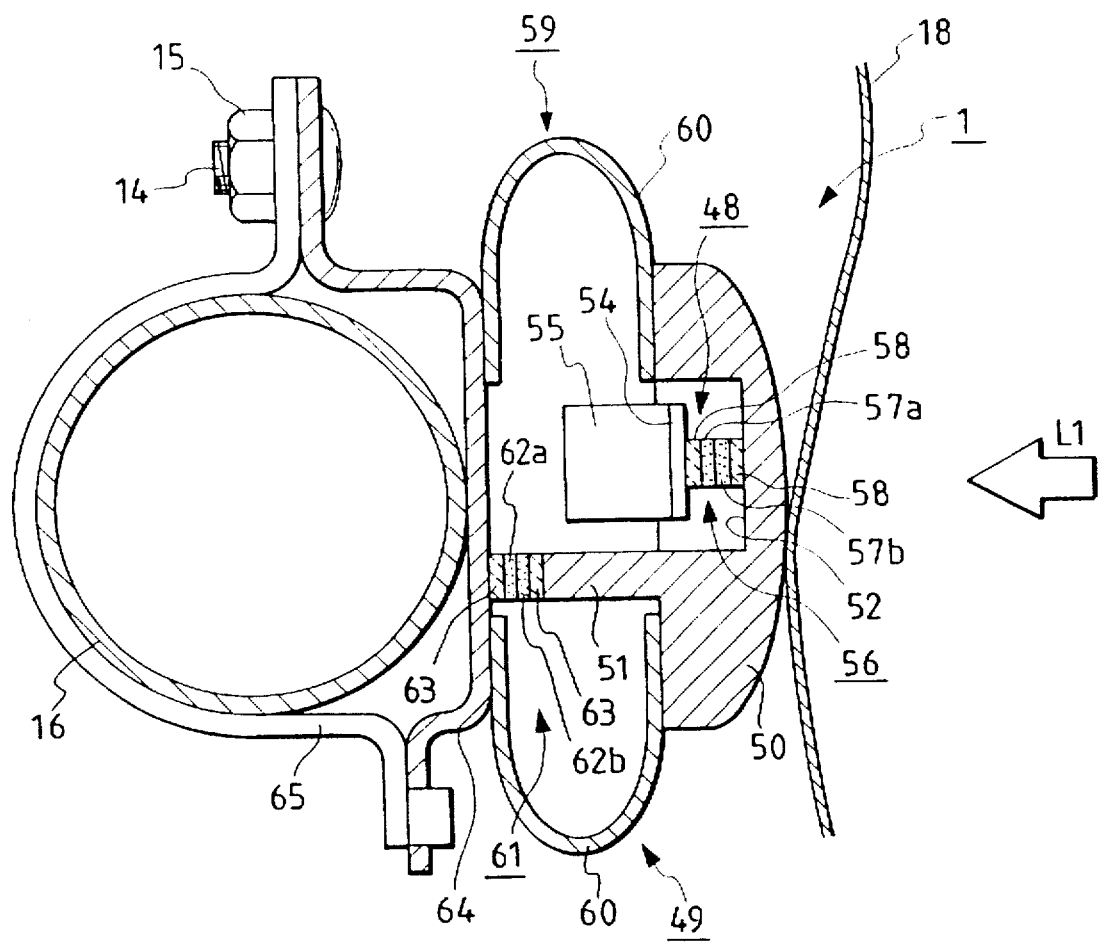
FIG. 24 is a cross-sectional view illustrating one aspect of the operational condition of the collision detecting apparatus in accordance with the fourth embodiment of the present invention.

FIG. 24 shows a cross-sectional view showing the response of the collision detecting apparatus 1 to an impact force L1 acting on the door outer panel 18 upon collision of the vehicle. More specifically, when received the impact force L1, the door outer panel 18 deforms inwardly so that both the pressure receiving block 50 and the leaf spring 59 are deformed inwardly. Thus, the contacts 62a and 62b are brought into contact with each other; therefore, the contact switch 61 of the deformation sensor 49 is turned on and produces an ON signal to be sent to the control circuit 19 of FIG. 5.

Meanwhile, the collision of vehicle will generate an acceleration greater than the predetermined minimum threshold value, accompanied by an inertia force sufficiently large to move the inertia mass 55 supported at the distal end of the leaf spring 54 in a cantilever manner. Hence, the leaf spring 54 is deflected so that the contacts 57a and 57b are brought into contact with each other. Thus, the contact switch 56 of the G sensor 48 is turned on and produces an ON signal to be sent to the control circuit 19. Accordingly, the control circuit 19 produces the actuation signal to be supplied to the igniter 101 in response to both of ON signals received from the deformation sensor 49 and the G sensor 48.

Figure 25:
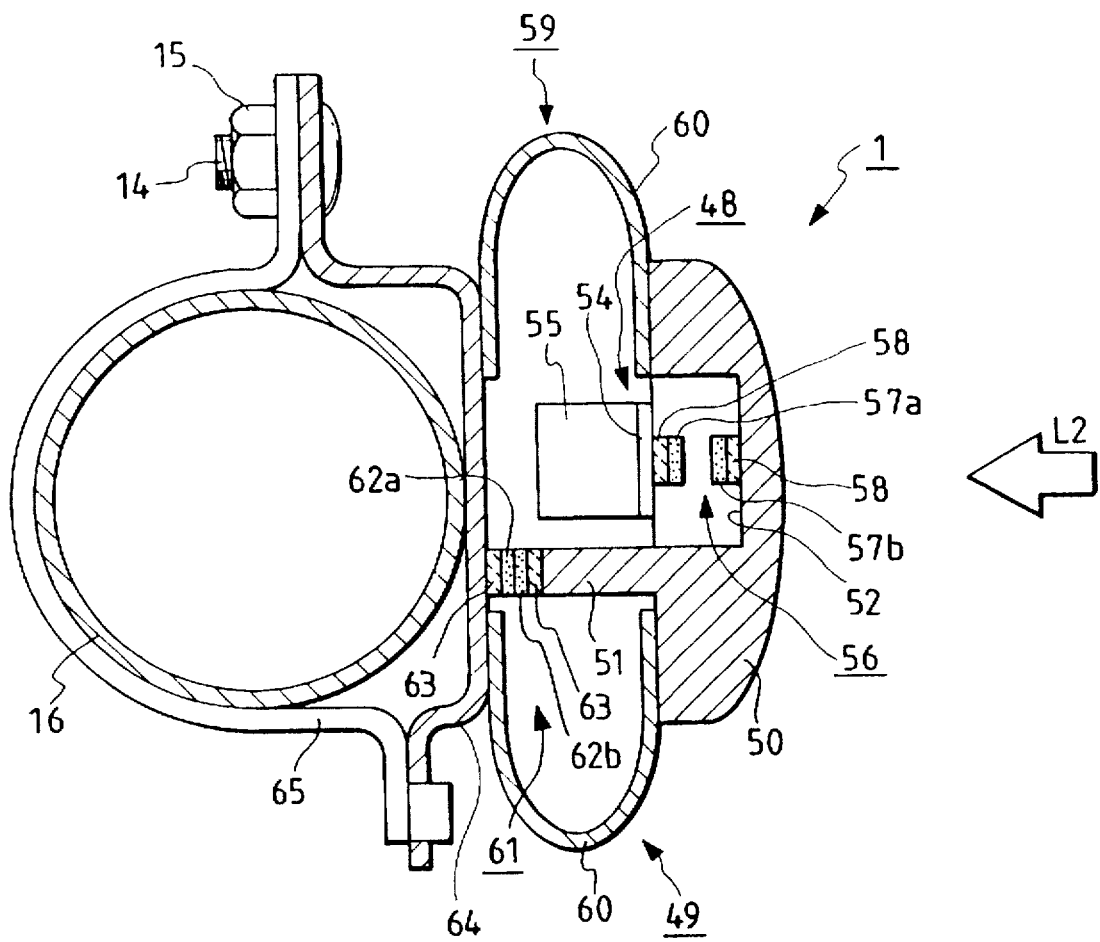
FIG. 25 is a cross-sectional view illustrating another aspect of the operational condition of the collision detecting apparatus in accordance with the fourth embodiment of the present invention.

FIG. 25 shows a cross-sectional view showing the response of the collision detecting apparatus 1 having caused to deformation of the door outer panel 18 caused by being pushed by a hand. More specifically, when such a manual pushing force L2, is applied the door outer panel 18 (not shown in FIG. 25) deforms inwardly so that both the pressure receiving block 50 and the leaf spring 59 are deformed inwardly. Thus, the contacts 62a and 62b are brought into contact with each other; therefore, the contact switch 61 of the deformation sensor 49 is turned on and produces an ON signal to be sent to the control circuit 19 of FIG. 5.

However, the acceleration generated in this case is less than the predetermined threshold above described, because of no inertia force acting on the door. Thus, the inertia mass 55 does not cause a movement, and the contact switch 56 remains inactivated. Hence, the G sensor 48 produces an OFF signal and sends it to the control circuit 19. Accordingly, the control circuit 19 does not produce the actuation signal due to presence of the OFF signal sent from the G sensor 48, and thus the air bag 102 is not deployed. In this manner, the air bag 102 is prevented from being unintentionally deployed.

Figure 26:
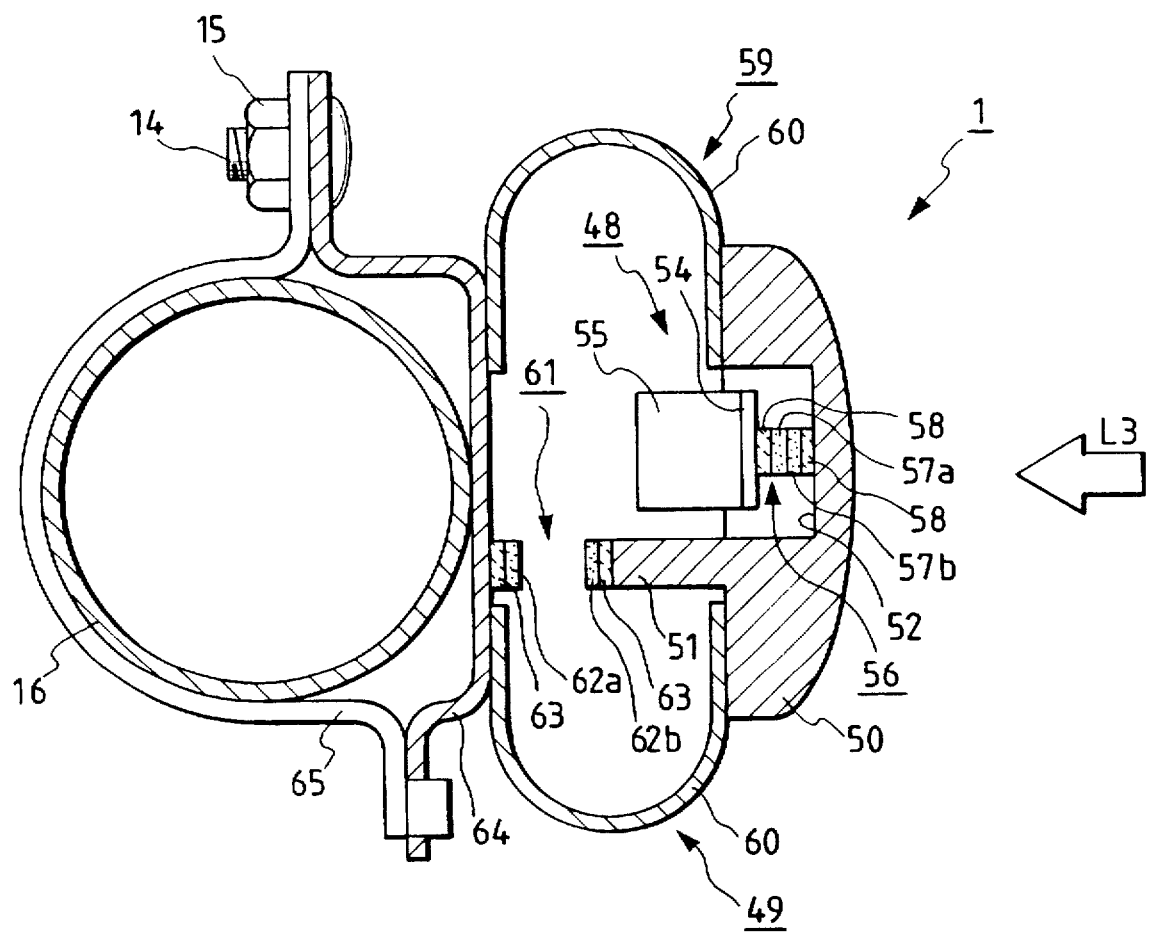
FIG. 26 is a cross-sectional view illustrating still another aspect of the operational condition of the collision detecting apparatus in accordance with the fourth embodiment of the present invention.

FIG. 26 shows a cross-sectional view showing the response of the collision detecting apparatus 1 to the opening/closing operation of the door. More specifically, when the door is opened or closed, a centrifugal force L3 acts on the door. When such a centrifugal force L3 causes an acceleration greater than the predetermined threshold above described, the inertia mass 55 is deflected so as to turn on the contact switch 56. Thus, the G sensor 48 produces an ON signal and sends it to the control circuit 19. However, the door outer panel 18 (not shown in FIG. 26) has not been deformed in this case, so the contact switch 61 remains in a default position. Namely, the deformation sensor 48 generates an OFF signal and sends it to the control circuit 19. Accordingly, the control circuit 19 does not produce the actuation signal due to presence of the OFF signal sent from the deformation sensor 49, and thus the air bag 102 is not deployed. Thus, the air bag 102 is prevented from being inflated unintentionally.

As explained above, the present embodiment actuates the igniter 101 of the air bag 102 only when both the deformation sensor 49 and the G sensor 48 simultaneously generate ON signals, thereby surely detecting the collision of vehicle and preventing the air bag 102 from being inflated unintentionally.

Although the above embodiments applies the collision detecting apparatus to the vehicle door, one should note that the collision detecting apparatus of the present invention can be applied to any other place (e.g., a front nose or a rear bumper), of the automotive vehicle.

Moreover, the structures of the deformation sensor and the G sensor should not be limited to the embodiments disclosed above, since any type of sensors can be utilized as long as they function as intended.

Furthermore, the number of G sensors can be flexibly increased as the application demands it.

This invention may be embodied in several forms without departing from the spirit of essential characteristics thereof. As such, the present embodiments as described are therefore intended to be only illustrative and not restrictive, since the scope of the invention is defined by the appended claims rather than by the description preceding them. It follows that all changes that fall within metes and bounds of the claims, or equivalents of such metes and bounds, are therefore intended to be embraced by the claims.

What is claimed is:

1. A collision detecting apparatus comprising:
   a base;
   deformation sensing means, disposed on said base, for detecting a deformation caused by a collision;
   acceleration sensing means, disposed on said base, for detecting an acceleration generated by said collision;
   detecting means for detecting occurrence of said collision based on said deformation sensing means and said acceleration means.

2. The collision detecting apparatus defined by claim 1, wherein said detecting means judges the occurrence of said collision only when the deformation caused by the collision and the acceleration generated by said collision are simultaneously detected by said deformation sensing means and said acceleration sensing means.

3. The collision detecting apparatus defined by claim 2, wherein said detecting means generates an actuation signal in response to the occurrence of the collision, said actuation signal being supplied to an igniter for exploding an air bag installed in a vehicle.

4. The collision detecting apparatus defined by claim 1, wherein said deformation sensing means comprises a switch deformable in a direction of the collision and operable in response to the deformation.

5. The collision detecting apparatus defined by claim 1, wherein said acceleration sensing means comprises an inertia mass urged by a resilient member in a predetermined direction, and a switch operable in response to a movement of said inertia mass moving against a resilient force of said resilient member.

6. The collision detecting apparatus defined by claim 1, wherein said collision detecting apparatus is installed in a vehicle, and said deformation sensing means and said acceleration sensing means are both provided at a same portion of said vehicle to be subjected to the collision.

7. The collision detecting apparatus defined by claim 1, wherein said collision detecting apparatus has a configuration elongated along a portion of a vehicle to be subjected to the collision.

8. The collision detecting apparatus defined by claim 1, wherein said deformation sensing means and said acceleration sensing means are both fixed to a reinforcement beam member provided in a door of a vehicle.

9. A collision detecting apparatus provided inside an outer panel of an automotive vehicle comprising:
   a base;
   deformation sensing means, mounted on said base, for detecting a deformation of said outer panel caused by a collision of said vehicle;
   acceleration sensing means, mounted on said base, for detecting an acceleration generated by said collision;
   detecting means for detecting occurrence of collision based on said deformation sensing means and said acceleration sensing means.

10. The collision detecting apparatus defined by claim 9, wherein said detecting means judges the occurrence of the collision only when the deformation of the outer panel caused by said collision and the acceleration generated by said collision are simultaneously detected by said deformation sensing means and said acceleration sensing means.

11. The collision detecting apparatus defined by claim 10, wherein said detecting means generates an actuation signal in response to the occurrence of the collision, said actuation signal being supplied to an igniter for exploding an air bag installed in a passenger compartment.

12. The collision detecting apparatus defined by claim 9, wherein said collision detecting apparatus is provided adjacent to a door outer panel.

13. The collision detecting apparatus defined by claim 12, wherein said collision detecting apparatus is fixed on a reinforcement beam member provided in a door of the vehicle.

14. The collision detecting apparatus defined by claim 13, wherein said reinforcement beam member extends in a lateral direction of the door, and said deformation sensing means laterally extends along said reinforcement beam member with a longitudinal size substantially identical with an entire length of said reinforcement beam member.

15. The collision detecting apparatus defined by claim 9, wherein said deformation sensing means includes a combination of a tape switch and a lever, said lever being supported in a cantilever manner between said tape switch and said outer panel in a spatially separated relation from each other.

16. The collision detecting apparatus defined by claim 15, wherein said lever is divided into a plurality of leaf spring segments arrayed along said outer panel, each segment being deformable when receiving an external force.

17. The collision detecting apparatus defined by claim 9, wherein said acceleration sensing means comprises a housing, a contact switch and an eccentric mass swingable about a rotational shaft provided on a support member, wherein said contact switch, said eccentric mass and said support member are accommodated together in said housing so that said eccentric mass is swung and brought into contact with said contact switch in response to the acceleration generated by the collision.

18. The collision detecting apparatus defined by claim 9, wherein said acceleration sensing means includes a combination of a spring and a mass.

19. The collision detecting apparatus defined by claim 9, wherein said acceleration sensing means comprises a spherical inertia mass, a compression spring, a contact switch and a lever which are accommodated together in a housing.

20. Th e collision detecting apparatus defined by claim 9, wherein said deformation sensing means is a liquid-in-pipe deformation sensor, including a combination of a pipe filled with liquid and a piston-lever type contact switch disposed at one end of said pipe.

21. The collision detecting apparatus defined by claim 20, wherein said piston-lever type contact switch comprises a piston-lever slidable in a bore and resiliently urged by a spring so as to be spaced from a contact element, said piston-lever being shiftable and brought into contact with said contact element in response to an increased pressure of said liquid in said pipe.

22. The collision detecting apparatus defined by claim 20, wherein said pipe is elongated so as to have a length substantially equal to the entire length of the collision detecting apparatus.

23. A collision detecting apparatus provided inside an outer panel of an automotive vehicle comprising:
   deformation sensing means for detecting a deformation of said outer panel caused by a collision of said vehicle;
   acceleration sensing means for detecting an acceleration generated by said collision;
   detecting means for detecting occurrence of said collision based on said deformation sensing means and said acceleration sensing means, wherein said acceleration sensing means comprises a spherical inertia mass, a compression spring, a contact switch and a lever which are accommodated together in a housing having first and second chambers communicated by a passage, said first chamber accommodating said inertia mass and said compression spring therein and said second chamber accommodating said contact switch, with said lever disposed in said passage in a manner that allows it to swing like a seesaw, so that one end of said lever is swung in response to a shift movement of said inertia mass against a resilient force of said compression spring in said first chamber and an opposite end of said lever is responsively swung so as to push said contact switch.

24. A collision detecting apparatus provided inside an outer panel of an automotive vehicle comprising:

deformation sensing means having a leaf spring member, a pressure receiving block supported on said leaf spring member, and a first contact switch for detecting a deformation of said outer panel caused by a collision of said vehicle, with said leaf spring member and pressure receiving block defining a space therein;

acceleration sensing means having a second contact switch for detecting an acceleration generated by said collision;

detecting means for detecting occurrence of said collision based on output signals obtained from said first contact switch of said deformation sensing means and said second contact switch of said acceleration means;

wherein both of said first contact switch of said deformation sensing means and said second contact switch of said acceleration sensing means are disposed in said space defined by said pressure receiving block and said leaf spring member, and said first contact switch of said deformation sensing means including a pair of contacts disposed in a spaced relation, in such a manner that one contact is fixed on a rigid member and the other contact is provided on said pressure receiving block, whereby said contacts are brought into contact with each other when said pressure receiving block is resiliently moved in response to the collision of the vehicle.

25. A collision detecting apparatus provided inside an outer panel of an automotive vehicle comprising:

deformation sensing means having a leaf spring member, a pressure receiving block supported on said leaf spring member, and a first contact switch for detecting a deformation of said outer panel caused by a collision of said vehicle, with said pressure receiving block and said leaf spring member defining a space therein;

acceleration sensing means having a second contact switch for detecting an acceleration generated by said collision;

detecting means for detecting occurrence of said collision based on said first contact switch of said deformation sensing means and said second contact switch of said acceleration means;

wherein both of said first contact switch of said deformation sensing means and said second contact switch of said acceleration sensing means are disposed in said space defined by said leaf spring member and said pressure receiving block, and said second contact switch of said acceleration sensing means including a first contact being fixed on a distal end of an inertia mass supported in a cantilever manner and a second contact being disposed in a spaced relation to said first contact, so that said contacts are brought into contact with each other when said inertia mass is swung in response to the collision of the vehicle.

* * * * *